(12) United States Patent
Drevdal et al.

(10) Patent No.: US 10,619,423 B2
(45) Date of Patent: Apr. 14, 2020

(54) PIPING BODY HAVING AN RFID TAG

(71) Applicant: Tuboscope Norge AS, Agotnes (NO)

(72) Inventors: Kjell Erik Drevdal, Stavanger (NO); Halvor Halvorsen, Stavanger (NO)

(73) Assignee: TUBOSCOPE NORGE AS, Agotnes (NO)

(*) Notice: Subject to any disclaimer, the term of this patent is extended or adjusted under 35 U.S.C. 154(b) by 0 days.

(21) Appl. No.: 16/257,152

(22) Filed: Jan. 25, 2019

(65) Prior Publication Data

US 2019/0153787 A1 May 23, 2019

Related U.S. Application Data

(63) Continuation of application No. 15/509,819, filed as application No. PCT/NO2015/050177 on Sep. 30, 2015, now Pat. No. 10,227,829.

(30) Foreign Application Priority Data

Oct. 7, 2014 (NO) .................................... 20141198

(51) Int. Cl.
*F16L 15/00* (2006.01)
*E21B 17/00* (2006.01)
(Continued)

(52) U.S. Cl.
CPC .......... *E21B 17/006* (2013.01); *E21B 17/042* (2013.01); *F16L 15/001* (2013.01);
(Continued)

(58) Field of Classification Search
CPC ............. G06K 19/0723; F16L 2201/60; F16L 15/001; E21B 17/006; E21B 17/042
(Continued)

(56) References Cited

U.S. PATENT DOCUMENTS 5,202,680 A ‡ 4/1993 Savage ................. E21B 17/006
  175/40
8,689,836 B2 ‡ 4/2014 Hudson ................. F16L 11/124
  138/104
(Continued)

FOREIGN PATENT DOCUMENTS

GB 2472929 Z 2/2011
GB 2472929 ‡ 4/2011
(Continued)

OTHER PUBLICATIONS

Search report for PCT/NO2014/1198 (2 Pages).‡
(Continued)

*Primary Examiner* — Patrick F Brinson
(74) *Attorney, Agent, or Firm* — Conley Rose, P.C.

(57) ABSTRACT

A tubular has a central axis and includes a first end, a second end, and a radially outer surface extending axially from the first end to the second end. In addition, the tubular includes a first end section at the first end, a second end section at the second end, and a mid-section extending axially from the first end section to the second end section. The first end section includes a first threaded portion and the second end section includes a second threaded portion. Further, the tubular includes an elongate recess extending radially inward from the radially outer surface. The elongate linear recess is positioned along the mid-section axially between the first threaded portion and the second threaded portion. The elongate linear recess has a longitudinal axis oriented parallel to the central axis of the tubular. The tubular also includes an elongate RFID tag seated in the elongate recess.

16 Claims, 4 Drawing Sheets

(51) Int. Cl.
*G06K 19/077* (2006.01)
*E21B 17/042* (2006.01)
*G06K 19/07* (2006.01)

(52) U.S. Cl.
CPC ....... *G06K 19/077* (2013.01); *G06K 19/0723* (2013.01); *G06K 19/07758* (2013.01); *F16L 2201/60* (2013.01)

(58) Field of Classification Search
USPC .............................. 138/104; 166/255.1, 65.1
See application file for complete search history.

(56) References Cited

U.S. PATENT DOCUMENTS

| | | | | |
|---|---|---|---|---|
| 8,985,156 B2 ‡ | 3/2015 | Drouin | ................ | B65D 59/06 138/104 |
| 9,824,347 B2 ‡ | 11/2017 | Griggs | ................ | G06Q 20/203 |
| 2002/0014966 A1 ‡ | 2/2002 | Strassner, II | .......... | E21B 17/006 340/572.1 |
| 2002/0158120 A1 ‡ | 10/2002 | Zierolf | ................ | E21B 17/006 235/37 |
| 2005/0230109 A1 ‡ | 10/2005 | Kammann | ............ | E21B 17/006 166/25 |
| 2006/0108113 A1 ‡ | 5/2006 | Scott | ................ | B01D 33/0376 166/25 |
| 2007/0023185 A1 ‡ | 2/2007 | Hall | ..................... | E21B 17/003 166/255.1 |
| 2007/0124220 A1 ‡ | 5/2007 | Griggs | ................ | E21B 17/006 705/28 |
| 2007/0158390 A1 ‡ | 7/2007 | Anderson | ............ | B23K 20/023 228/10 |
| 2009/0159693 A1 ‡ | 6/2009 | Steffensen | ............ | E21B 17/006 235/49 |
| 2010/0245075 A1 * | 9/2010 | Stevens | ................ | G06Q 10/08 340/539.1 |
| 2011/0175343 A1 ‡ | 7/2011 | Akins | ................ | G09F 3/00 283/74 |
| 2013/0056538 A1 * | 3/2013 | Binmore | ............... | F16L 15/001 235/492 |
| 2013/0285829 A1 ‡ | 10/2013 | Pacheco | ........... | G06K 19/07728 340/85 |
| 2015/0014420 A1 ‡ | 1/2015 | Pacheco | ........... | G06K 19/07758 235/492 |

FOREIGN PATENT DOCUMENTS

| | | | | |
|---|---|---|---|---|
| WO | 91/17514 A1 | 11/1991 | | |
| WO | WO-91/17514 A1 ‡ | 11/1991 | .......... | E21B 17/006 |
| WO | 2011/109631 A2 | 9/2011 | | |
| WO | WO-2011109631 | ‡ | 9/2011 | |
| WO | 2012/152657 A1 | 11/2012 | | |
| WO | WO-2012/152657 A1 ‡ | 11/2012 | ............. | E21B 17/02 |
| WO | 2016/056920 A1 | 4/2016 | | |

OTHER PUBLICATIONS

Written Opinion for PCT/NO2015/050177 dated Feb. 5, 2016 (6 pages).‡
Initial Publication for PCT/NO2015/050177 dated Apr. 14, 2016 (15 pages).‡
Third Party Observation submitted by Anonymous regarding PCT/NO2015/050177 (1 page).‡
Search Report dated May 6, 2015, for Norwegian Application No. 20141198 (2 p.).
Written Opinion for PCT/NO2015/050177 dated Feb. 5, 2016 (6 p.).
PCT Third Party Observation submitted by Anonymous on Nov. 9, 2016 regarding PCT/NO2015/050177 (1 p.).
Office Action dated Jun. 1, 2018, for U.S. Appl. No. 15/509,819 (9 p.).
Response to Office Action dated Jun. 1, 2018, for U.S. Appl. No. 15/509,819; Response filed Sep. 24, 2018 (9 p.).
Notice of Allowance dated Nov. 15, 2018, for U.S. Appl. No. 15/509,819 (7 p.).

\* cited by examiner
‡ imported from a related application

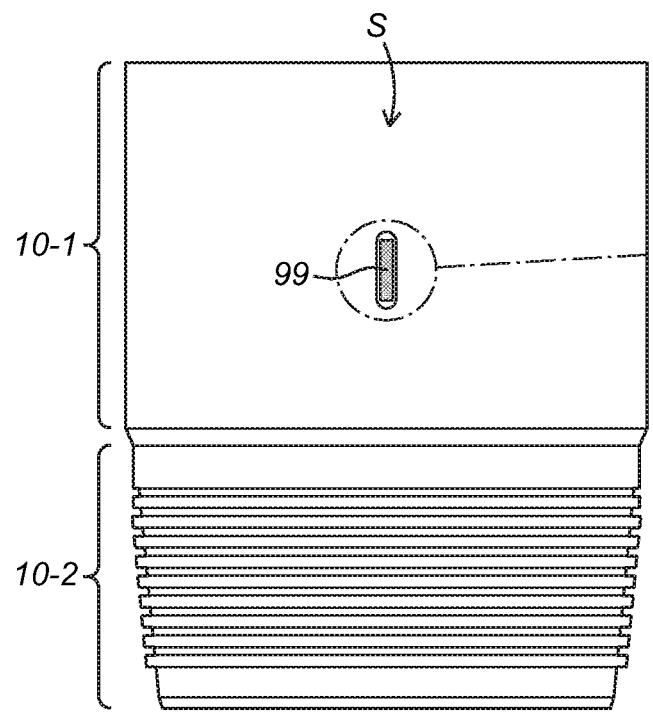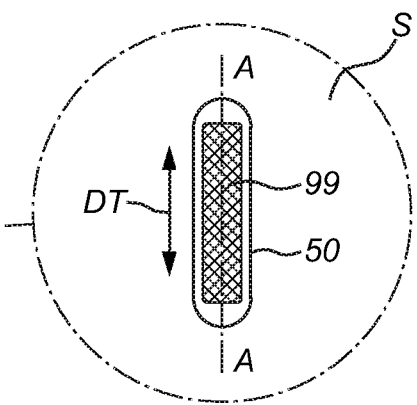
Fig. 2b
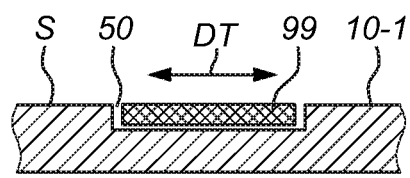
Fig. 2c
Fig. 2a
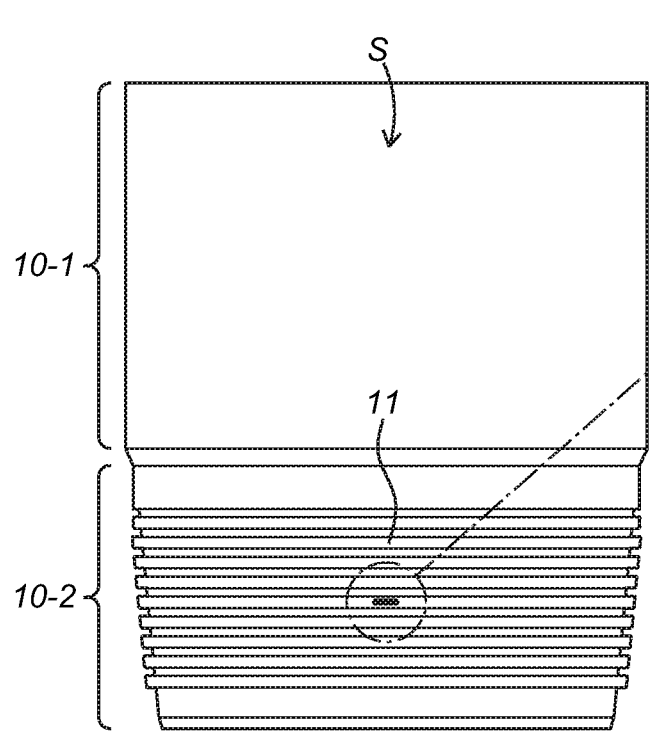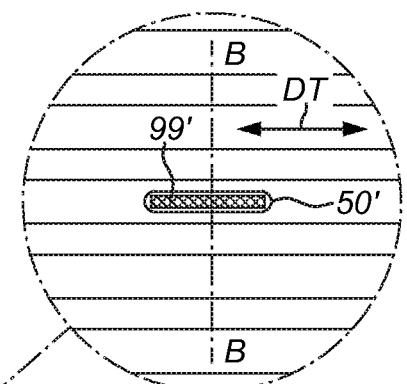
Fig. 3b
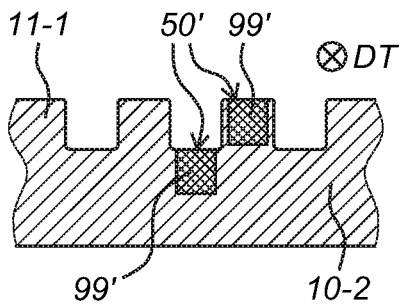
Fig. 3c
Fig. 3a

PIPING BODY HAVING AN RFID TAG

CROSS REFERENCE TO RELATED APPLICATIONS

This application is a continuation of U.S. application Ser. No. 15/509,819 filed Mar. 8, 2017, which is a 35 U.S.C. § 371 national stage application of PCT/NO2015/050177 filed Sep. 30, 2015. This application also claims priority to said PCT/NO2015/050177 and to Norwegian Application No. 20141198 filed Oct. 7, 2014. Each of the foregoing applications is incorporated herein by reference in their entirety for all purposes.

BACKGROUND

The invention relates to piping or tubular structures, for use in an oil or gas environment, wherein the piping is provided with an RFID tag for identification purposes.

During drilling operations, for example as it is common in connection with the recovery of petroleum, a relatively great number of pipes are used, the pipes being screwed together into a pipe string. The pipe string may also include other equipment, for example controls and valve sections. A well of this kind is normally lined with casing in order to secure the borehole.

In order to keep track of the number of pieces of equipment and their physical condition, it has turned out to be useful to monitor the service time and stresses of the individual pipes and associated equipment, and also to keep track of the number and where the individual pipe is located in the pipe string.

It is known for an electronic ID tag to be placed on the pipe or equipment, which is read manually by means of matched equipment when the pipe is run into the well and when it is pulled from the well. U.S. Pat. No. 5,142,128 thus discloses an apparatus for identifying equipment related to the recovery of oil, which is also arranged to keep track of the service time of the equipment. The document describes a hand-held reading device for electronic ID tags.

Electronic ID tags of the kind concerned here, are mounted on the outside of the pipes near the connecting means of the pipes. Thereby, the ID tags can be read when passing an antenna. This positioning entails that the ID tags are subjected to wear during the moving of the pipe in the borehole and to damage from, for example, power tongs during make-up and break-out operations. It has also turned out that the attachment of the ID tags in the pipes is adversely affected by relatively large pressure variations in the well.

Equipment according to the prior art exhibits drawbacks related to applicability and/or reliability, as, among other things, the range of signals from the ID tags is relatively small, the ID tags are subjected to wear and may be damaged during the assembling of the pipes.

WO2006/041306A1, which is from a patent family owned by the applicant, discloses an RFID system that is provided on a pipe segment for identification purposes. WO2006/041306A1 is incorporated by reference in its entirety. In this specification, conventional RFID technology as such is considered to be well known and will therefore not be further explained. Various RFID tags having various dimensions are available on the market. The current disclosure does not aim to improve upon those tags as such, nor upon the system for reading such RFID tags when provided on a piping or tubing.

SUMMARY

The embodiments disclosed herein are provided in an attempt to remedy or to reduce at least one of the drawbacks of the prior art, or at least provide a useful alternative to prior art. These embodiments are specified in the description below and in the claims that follow.

In an embodiment, piping for use in an oil or gas environment is provided with an RFID tag for identifying said piping. Said piping comprises a first end section for being coupled to a second piping and a second end section, wherein said piping further comprises a mid-section in between said end sections. The RFID tag is provided in an elongate recess that is formed in the piping and wherein said recess extends in a tangential direction parallel to a surface of the mid-section of the piping.

The effects of the combination of the features described herein include the following. By providing the RFID tag in a recess, which extends in a tangential direction parallel to the surface of the mid-section of the piping, it is achieved that the strength of the piping is hardly affected by the trench. In contrast with this, certain prior art solutions include the provision of a recess which extends orthogonal to said surface, which inherently reduces the strength of the piping, and thereby puts severe limitations on the feasibility of applying a tag to a piping.

In an embodiment, the recess has been formed as a shallow elongate recess. Making a shallow elongate recess, meaning that the recess is elongate in a direction parallel to a surface in which it is made, has the advantage that the integrity and strength of the piping is preserved as much as possible, in case the RFID tag is positioned at an outer surface of the piping.

In an embodiment, the recess has been formed in a threaded section in at least one of said end sections. When it comes down to making a recess in the threaded section, there are two advantageous options. The first option is to form the recess in a thread crest. The second option is form the recess in between respective thread crests.

In an embodiment, the recess has been formed in the mid-section of the piping. Of all embodiments, this one is the most counter-intuitive. Expressed differently, there is a general prejudice in the field not to tamper with the mid-section of a piping. The inventors are the first to realize and establish that this still can be done without reducing the integrity and strength of the piping to dangerous levels. This is particularly so, because the inventors have chosen for a shallow recess, which is elongate in a direction parallel to the surface, wherein the recess is made. Elongate and thin RFID tags suitable for this embodiment are available on the market.

In an embodiment, the recess has been formed as a hole in a rim of said piping, wherein the hole extends in a tangential direction parallel to the surface of the mid-section of the piping. This embodiment surprisingly results in a minimum reduction in the integrity and strength of the piping.

BRIEF DESCRIPTION OF THE DRAWINGS

Exemplary embodiments are illustrated in the accompanying drawings, wherein:

FIGS. 2a-2c illustrate a first embodiment of a piping in accordance with principles described herein;

FIGS. 3a-3c illustrate a second embodiment of a piping in accordance with principles described herein;

FIG. 4b shows an enlarged view of FIG. 4a;

FIG. 5b shows an enlarged view of FIG. 5a.

DETAILED DESCRIPTION OF DISCLOSED EXEMPLARY EMBODIMENTS

The embodiments discussed above and described hereinafter illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The embodiments disclosed herein may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

Figure 1:
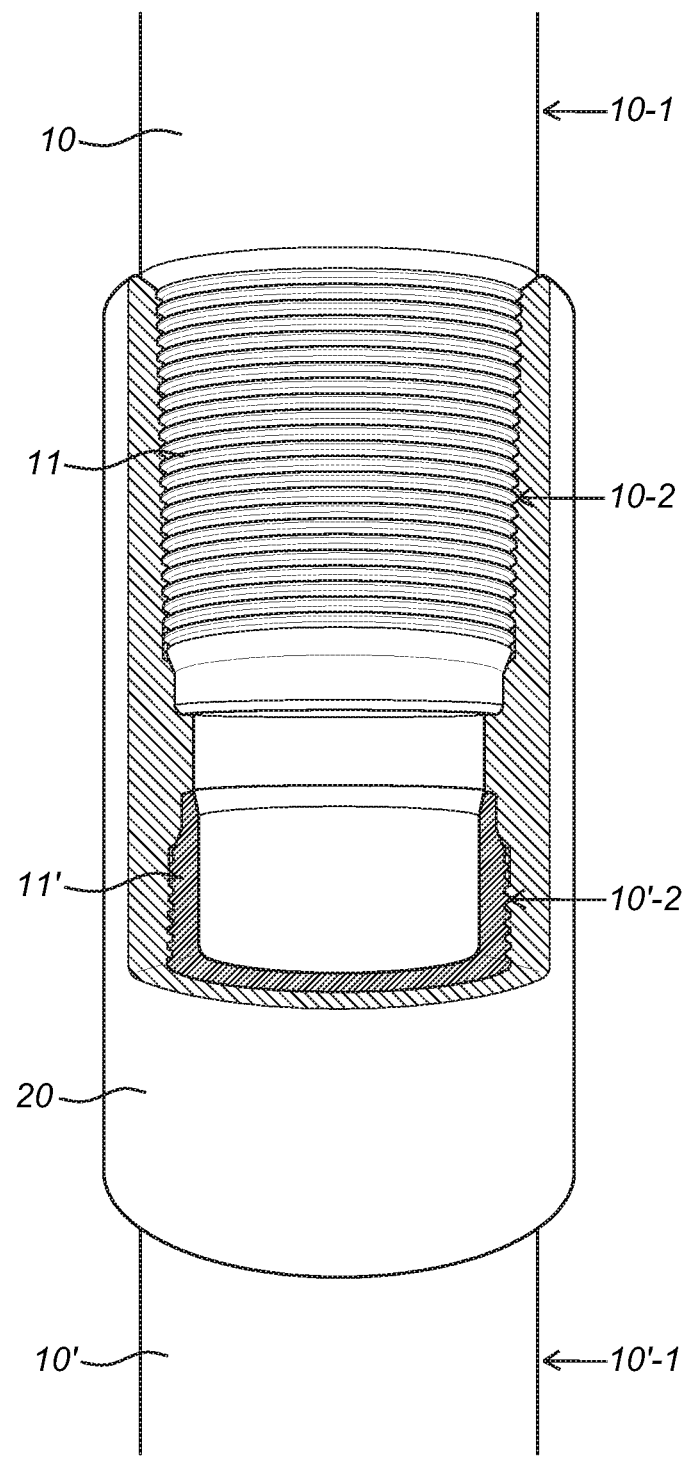
FIG. 1 shows a connection of two pipings for use in the oil or gas industry.

FIG. 1 shows a connection of two pipings for use in the oil or gas industry. The figure shows a first piping 10 that is connected with a second or further piping 10'. In this embodiment this is done by means of a separate coupling joint 20. However, the coupling joint 20 may also be integrated with one of said pipings 10, 10'. In this embodiment the first piping 10 has a mid-section 10-1 and two end sections 10-2 (of which only one is visible). Likewise, the second piping 10' has a mid-section 10'-1 and two end sections 10'-2. The respective end sections 10-2 of the first piping 10 have threaded portions 11, which are matching with threaded portions in said coupling joint 20. Likewise, the respective end sections 10'-2 of the second piping 10' have threaded portions 11', which are matching with threaded portions in said coupling joint 20.

It must be noted that in the example of FIG. 1 the pipings have two male end portions, while the coupling joint has two female end portions. However, the principles disclosed herein are applicable also to male-female configurations without separate coupling joints, or pipings with two female ends with male coupling joints.

FIGS. 2a-2c illustrate a first embodiment of a piping in accordance with principles disclosed herein. In this embodiment a shallow elongate recess 50 (FIG. 2b) is formed which is elongated in a tangential direction DT with regards to an outer surface S of the mid-section of the piping 10 as illustrated in FIG. 2c. An RFID tag 99 is provided in the recess 50 as also illustrated in FIG. 2c. The RFID tag 99 can be mounted in the recess 50 in various ways, for instance by moulding or gluing. Alternatively, the mounting can be done in a mechanical way using threads, slots and the like. It is considered to fall within the normal expertise of a person skilled in the art how to mount or fix the RFID tag in the recess, such that it remains there in operational use of the piping.

FIGS. 3a-3c illustrate a second embodiment of a piping in accordance with principles disclosed herein. In this embodiment a shallow elongate recess 50' is formed in the end section 10-2 of the piping 10, more particularly in the threaded section 11 of the end section 10-2. A small-size RFID tag 99' is placed in the shallow elongate recess 50'. When the RFID tag 99' is placed in the threaded section 11 there is two advantageous options, which have been jointly illustrated in FIG. 3c. The first option is to place the RFID tag 99' in a recess 50' in a thread crest 11-1, and the second option is to place the RFID tag 99' in a recess 50' in between respective thread crests 11-1.

Figure 4C:
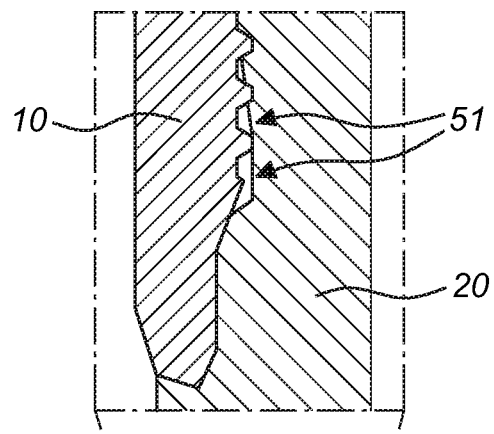
FIG. 4c shows an enlarged view of FIG. 4b.
Figure 4A:
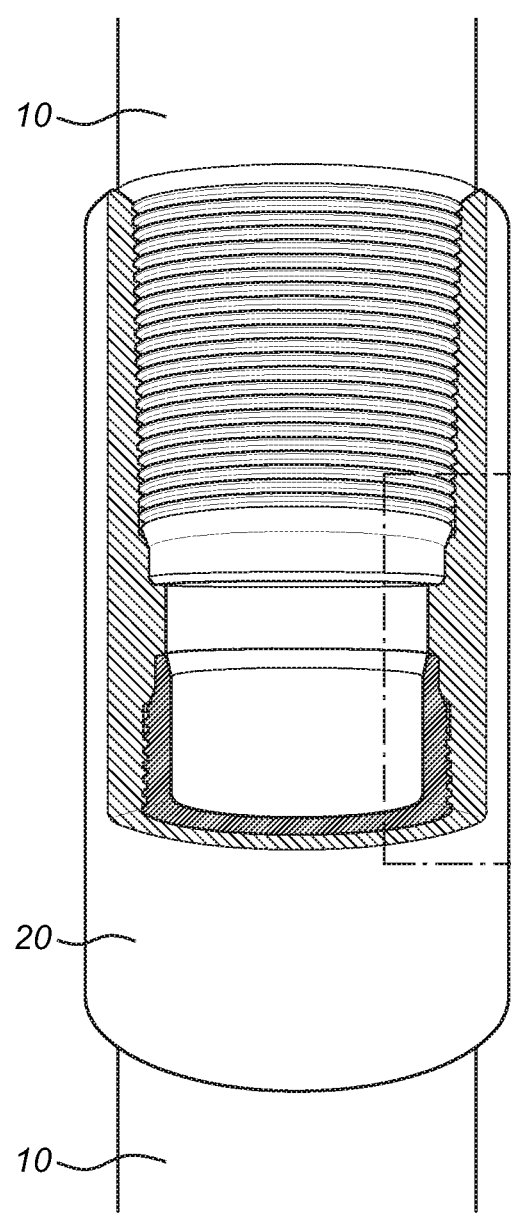
FIG. 4a illustrates the possibility of a possible further embodiment in accordance with principles described herein.
Figure 4B:
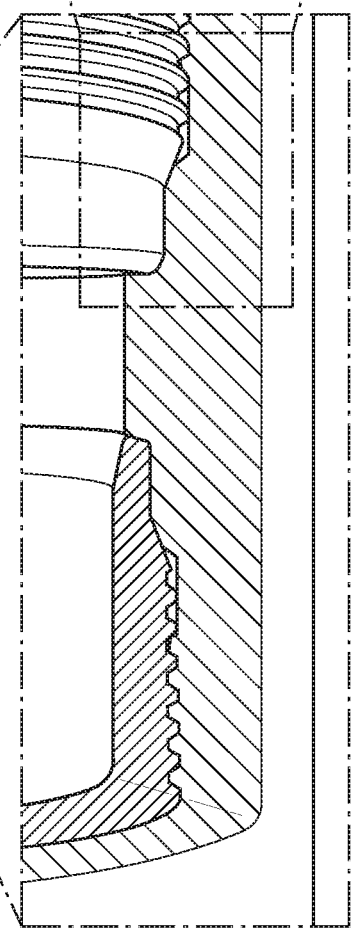

FIG. 4a illustrates the possibility of a possible further embodiment. The figure shows the same piping connection as FIG. 1. FIG. 4b shows an enlarged view of FIG. 4a. FIG. 4c shows an enlarged view of FIG. 4b. In FIG. 4c there is visible "natural cavities" 51 in between the respective threads of the coupling joint and the piping 10. These natural cavities 51 are also suitable for placing an RFID tag. This means that no cavity or a smaller cavity may be used to place the RFID tag in. Expressed differently, the RFID tag may protrude a little bit from the threaded surface.

Figure 5A:
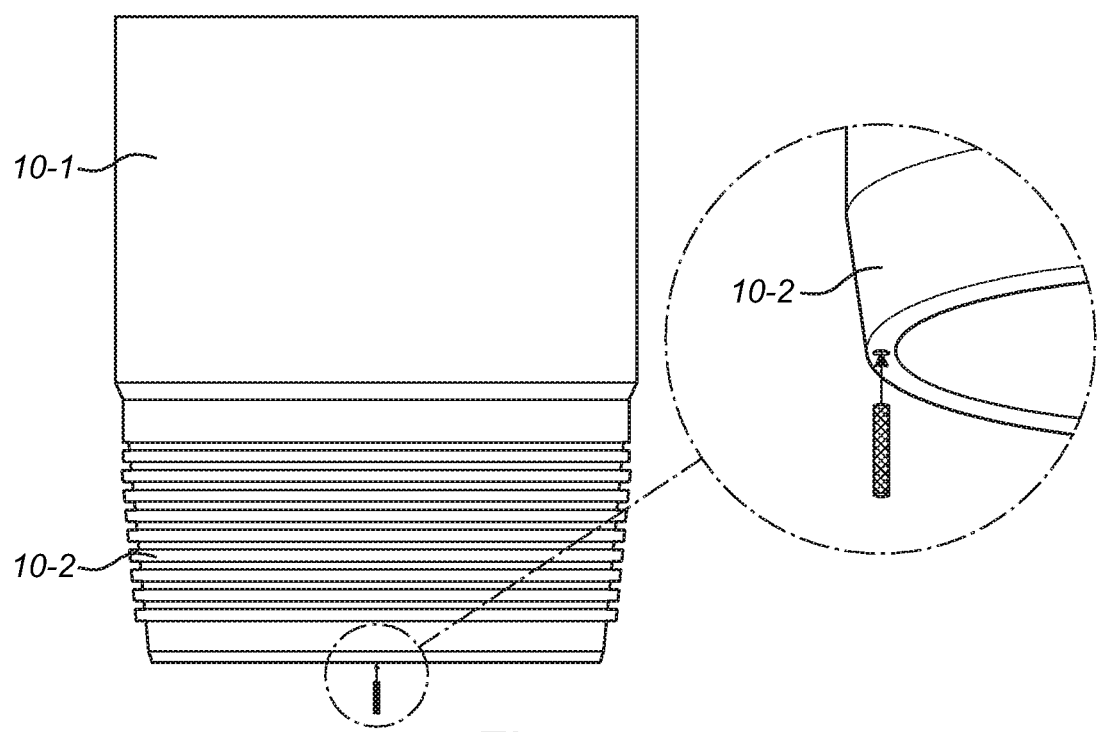
FIG. 5a illustrates a third embodiment of a piping in accordance with principles described herein.
Figure 5B:
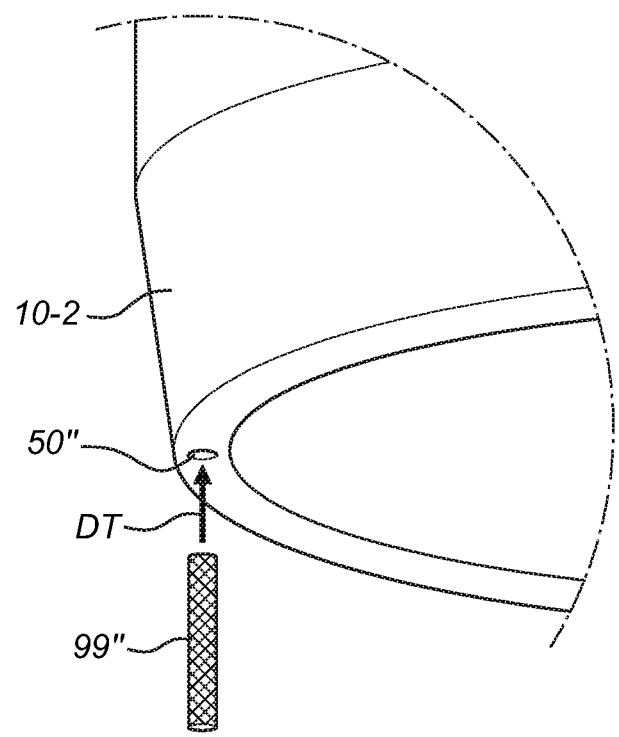

FIG. 5a illustrates a third embodiment of a piping in accordance with principles disclosed herein, and FIG. 5b shows an enlarged view of FIG. 5a. The main idea of this embodiment is to place the RFID tag 99'' in a deep elongate recess 50'' (or hole) in the rim of a piping 10 as best illustrated in FIG. 5b.

It must be noted that the embodiments disclosed herein are not limited only to pipings that transport oil or gas. Such pipings may also be drill string sections, risers, or pipings for transporting drill cuttings, water or other substances.

What is claimed is:

1. A tubular for use in an oil or gas environment, the tubular having a central axis and comprising:
    a first end, a second end opposite the first end, and a radially outer surface extending axially from the first end to the second end;
    a first end section at the first end, a second end section at the second end, and a mid-section extending axially from the first end section to the second end section, wherein the first end section includes a first threaded portion and the second end section includes a second threaded portion;
    an elongate recess extending radially inward from the radially outer surface, wherein the elongate recess is positioned along the mid-section axially between the first threaded portion and the second threaded portion, wherein the elongate recess has a longitudinal axis oriented parallel to the central axis of the tubular; and
    an elongate RFID tag seated in the elongate recess and oriented parallel to the longitudinal axis.

2. The tubular of claim 1, wherein the elongate RFID tag is positioned radially proximal the radially outer surface of the tubular.

3. The tubular of claim 1, wherein the elongate RFID tag has a first end positioned proximal a first end of the elongate recess and a second end positioned proximal a second end of the elongate recess.

4. The tubular of claim 1, wherein the elongate recess extends linearly and the RFID tag extends linearly within the elongate recess.

5. The tubular of claim 1, wherein the elongate recess is shallow.

6. The tubular of claim 1, wherein the elongate RFID tag is secured within the elongate recess.

7. The tubular of claim 6, wherein the elongate RFID tag is molded or glued in the elongate recess.

8. The tubular of claim 1, wherein the elongate RFID tag is positioned radially adjacent the radially outer surface of the tubular.

9. A piping for use in an oil or gas environment, comprising:
- an elongate tubular member having a central axis, a threaded end section, a non-threaded section axially adjacent to the threaded end section, and a radially outer surface extending axially along the threaded end section and the non-threaded section, wherein the radially outer surface comprises a cylindrical surface along the non-threaded section and a thread along the threaded end section;
- an elongate recess extending radially inward from the cylindrical surface, wherein the elongate recess has a longitudinal axis oriented parallel to the central axis of the elongate tubular member;
- an RFID tag for identifying the tubular member retained in the elongate recess.

10. The piping of claim 9, wherein the RFID tag is radially adjacent the cylindrical surface.

11. The piping of claim 9, wherein the RFID tag is elongate and oriented parallel to the longitudinal axis of the elongate recess.

12. The piping of claim 9, wherein the elongate RFID tag has a first end positioned proximal a first end of the elongate recess and a second end positioned proximal a second end of the elongate recess.

13. The piping of claim 9, wherein the elongate recess extends linearly and the RFID tag extends linearly within the elongate recess.

14. The piping of claim 9, wherein the elongate recess is shallow.

15. The piping of claim 9, wherein the elongate RFID tag is secured within the elongate recess.

16. The piping of claim 15, wherein the elongate RFID tag is molded or glued in the elongate recess.

* * * * *